United States Patent
Nichols

[11] Patent Number: 5,760,909
[45] Date of Patent: Jun. 2, 1998

[54] INTEGRATED APPARATUS AND METHOD FOR EDM AND GPS SURVEYING

[75] Inventor: Mark E. Nichols, Sunnyvale, Calif.

[73] Assignee: Trimble Navigation Limited, Sunnyvale, Calif.

[21] Appl. No.: 622,556

[22] Filed: Mar. 25, 1996

[51] Int. Cl.$^6$ .................... G01B 11/26; E02F 3/76
[52] U.S. Cl. .................. 356/4.08; 356/141.3; 342/357
[58] Field of Search ................ 342/357; 356/4.08, 356/141.3

[56] References Cited

U.S. PATENT DOCUMENTS

| | | |
|---|---|---|
| 3,778,159 | 12/1973 | Hines et al. |
| 4,146,927 | 3/1979 | Erickson et al. |
| 4,814,711 | 3/1989 | Olsen et al. |
| 4,949,089 | 8/1990 | Ruszkowski, Jr. |
| 5,077,557 | 12/1991 | Igensand. |
| 5,233,357 | 8/1993 | Ingensand et al. |
| 5,311,194 | 5/1994 | Brown. |
| 5,471,218 | 11/1995 | Talbot et al. .......... 342/357 |
| 5,512,905 | 4/1996 | Nichols et al. .......... 342/357 |
| 5,600,436 | 2/1997 | Gudat .................. 356/141.3 |
| 5,614,918 | 3/1997 | Dinardo et al. .......... 343/882 |

OTHER PUBLICATIONS

Spectra–Physics Geodimeter® 140T The Autotracking Total Station Operating Manual, Publ. No. GEO–0050 1989 pp. 1.1–7.2 for system pp. 5.9–5.10 prism reflector Geotronics Division of Spectra–Physics, Dayton, Ohio.

Leica 360 Reflector product information for GZR4 360 Degree Prism 1995 pp. 2 to 8 Leica Inc. Norcross, GA.

Condor Earth Powerpole™ Reflectorless Surveying no date pp. 1–2 Sonora, CA.

*Primary Examiner*—Mark Hellner
*Attorney, Agent, or Firm*—David R. Gildea

[57] ABSTRACT

An electronic distance measurement EDM apparatus (41) for attachment to a range pole (42), having a GPS antenna (12) having a circular exterior (46) with a reflective outer surface (54) for reflecting an EDM light beam (56) over an angular azimuth range of 360°. The reflective outer surface (54) is a thin material such as tape or paint. A GPS receiver (16) connects to the GPS antenna (12) for providing a GPS-derived location of a phase center (18) of the GPS antenna (12). An optional radio transmitter (20) transmits information for the GPS-derived location in a GPS location data signal (22). An optional radio receiver (24) receives a differential GPS (DGPS) correction signal (26) and/or a GPS real time kinematic signal (28) for use in improving the accuracy of calculation of the GPS-derived location. An integrated global positioning system / electronic distance measurement (GPS/EDM) surveying system (40) includes the EDM apparatus (41), the range pole (42), and a total station (58). The total station (58) calculates a range by beaming the EDM light beam (56) to the reflective outer surface (54) and receiving a reflection (62).

22 Claims, 1 Drawing Sheet

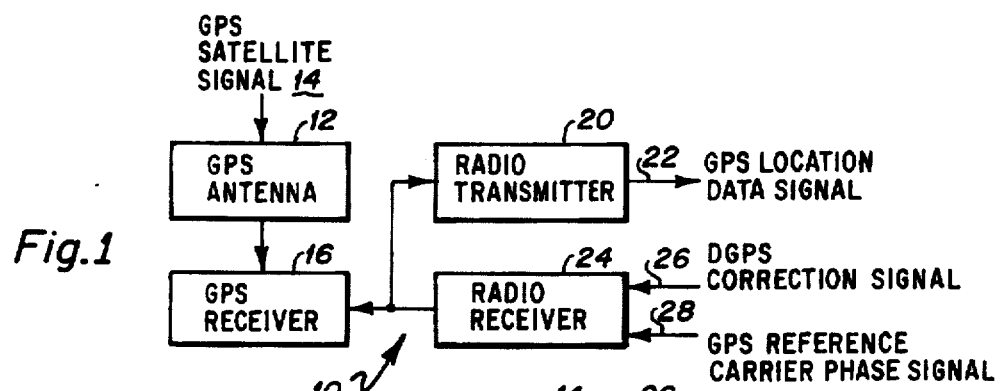
Fig.1
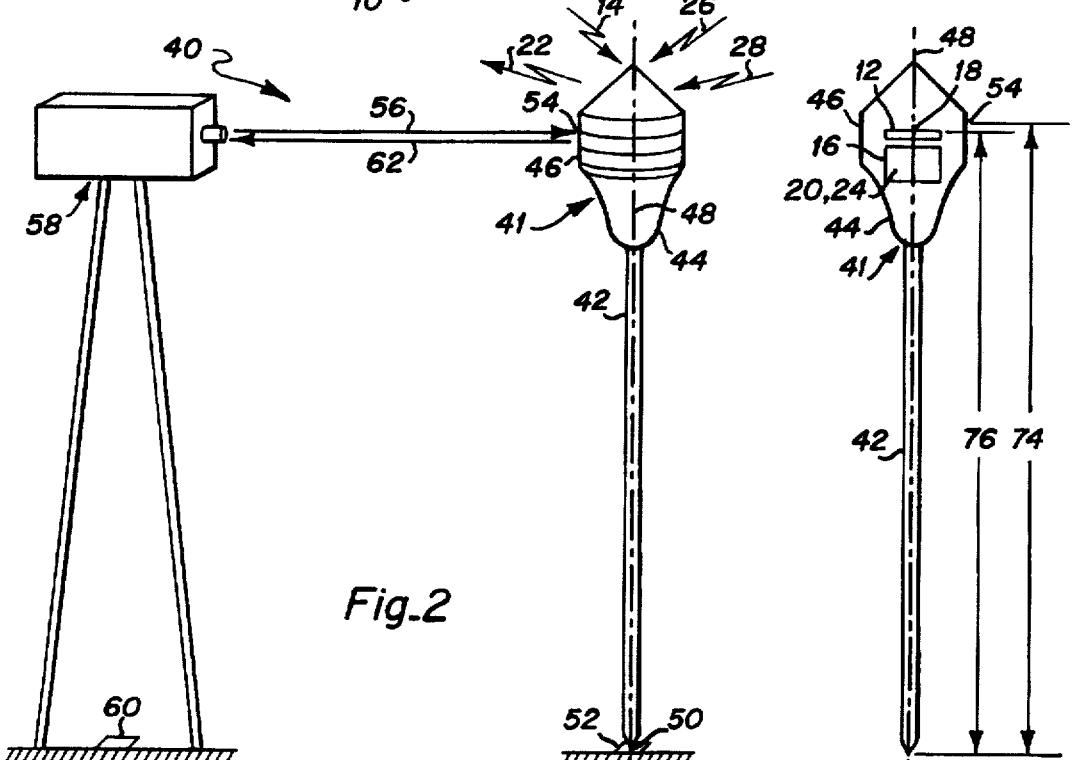
Fig.2
Fig.3B
Fig.3A

1

INTEGRATED APPARATUS AND METHOD FOR EDM AND GPS SURVEYING

BACKGROUND OF THE INVENTION

Field of the Invention

The invention relates generally to surveying equipment and more particularly to an electronic distance measurement (EDM) reflector having an integrated global positioning system (GPS) antenna for attachment to a surveying range pole.

Description of the Prior Art

Land surveyors commonly use a total station using electronic distance measurement (EDM) of a range pole for finding range, azimuth, and vertical angle between two location marks. The EDM is used for calculating the range from the time or phase change for a light beam emitted by a total station situated on one location mark to travel to the range pole situated on the other location mark and return to the total station. Typically, a reflector mounts on the range pole to reflect the light beam. The azimuth and vertical angle are obtained by sighting on the reflector through a lens in the total station.

Conventionally, the reflector on the range pole is a prism. EDM survey systems using prism reflectors are able to measure ranges of at least six kilometers. However, a limitation of using the prism is that the light beam must be received within a restricted angular range of the prism in order to be reflected. Attempts have been made to solve this limitation by using multiple prisms of more than ten centimeters in thickness, giving an effective angular range of up to 360°. Unfortunately, the use of multiple prisms increases the cost and the weight of the range pole. The heavier weight can be a major disadvantage because the range pole is typically carried by a single surveyor and is often used in rugged terrain.

Recently, EDM survey systems have been developed for using non-cooperative surfaces, such as a building or a survey stake, for reflecting the light beam. These systems have an advantage of not needing a special reflector. However, such systems are typically limited to ranges of less than one hundred meters and are not dependable for illuminating a sloping or stepped surface.

EDM has generic limitation in that the total station must have a line-of-sight to the range pole. Some surveyors work around this limitation by using a GPS surveyor when line-of-sight is difficult to obtain. However, this solution requires the surveyor to carry equipment for both the EDM and GPS systems. Talbot et al. in U.S. Pat. 5,471,218 discloses an integrated terrestrial survey and satellite positioning system where the total station and the range pole each combine features of EDM and GPS survey equipment. However, the range pole that is described is relatively heavy and expensive and has a narrow angular range for reflecting the EDM light beam.

SUMMARY OF THE INVENTION

It is therefore an object of the present invention to provide an inexpensive and light weight electronic distance measurement (EDM) apparatus for attachment to a range pole having an angular range of 360° for reflection of an EDM light beam.

Another object is to provide an integrated electronic distance measurement/global positioning system (EDM/GPS) surveying system providing a GPS-derived location and an EDM-derived range about an angular azimuth range of 360°.

Briefly, in a preferred embodiment, the present invention includes an EDM apparatus for attachment to a range pole having a GPS antenna for receiving a GPS satellite signal. The GPS antenna includes a circular exterior having a reflective outer surface for reflecting an EDM light beam over an angular azimuth range of 360°. The reflective outer surface is a light material such as tape, paint, of thin prism reflectors such as are used in bicycle reflectors. A GPS receiver connects to the GPS antenna for providing a GPS-derived location of a phase center of the GPS antenna. An optional radio transmitter transmits information for the GPS-derived location in a GPS location data signal. An optional radio receiver receives a differential GPS (DGPS) correction signal and/or a GPS real time kinematic signal for use in calculating the GPS-derived location. An integrated global positioning system/electronic distance measurement (GPS/EDM) surveying system includes the EDM apparatus, the range pole, and a total station. In EDM operation the total station calculates range from the time or phase change of a light beam to travel from the total station to a reflector on a range pole and return.

An advantage of the present invention of the EDM apparatus is that it provides a range pole with a 360° azimuth range with little added weight and at a low cost.

Another advantage of the present invention of the EDM/GPS survey system is that it provides a GPS-derived location for use when a survey line-of-sight is not necessarily available while providing an EDM-derived range for a survey line-of-sight over a 360° azimuth range about a range pole.

These and other objects and advantages of the present invention will no doubt become obvious to those of ordinary skill in the art after having read the following detailed description of the preferred embodiments which are illustrated in the various figures.

IN THE DRAWINGS

FIG. 1 is a block diagram of a global positioning system (GPS) receiver apparatus of the present invention;

FIG. 2 is a general view of a surveying system of the present invention; and

FIGS. 3a and 3b are side and top cross-sectional views, respectively, of an EDM apparatus including the GPS receiver apparatus of FIG. 1 and used in the surveying system of FIG. 2.

DETAILED DESCRIPTION OF THE PREFERRED EMBODIMENTS

FIG. 1 illustrates a block diagram of a global position system (GPS) receiver apparatus of the present invention referred to by the general reference number 10. The GPS receiver apparatus 10 includes a GPS antenna 12 for receiving a GPS satellite signal 14 including GPS location determination information from one or more GPS satellites and issuing a representative antenna output signal to a GPS receiver 16. The GPS receiver 16 uses the information in the antenna output signal for deriving a geographical location of a phase center 18 (FIGS. 3a, 3b) of the GPS antenna 12 and providing information for the location in a location data signal. An optional radio transmitter 20 receives the location data signal from the GPS receiver 16 and transmits a representative airwave GPS location data signal 22 for use by an external user. An optional radio receiver 24 receives an airwave differential GPS (DGPS) correction signal 26, including DGPS corrections provided from a DGPS system; and/or an airwave GPS real time kinematic (RTK) signal 28, including GPS reference carrier phase observations provided from an RTK system; and provides DGPS corrections and/or GPS reference carrier phase observations, respectively, to the GPS receiver 16.

Several DGPS systems exist or have been proposed for improving the accuracy of the GPS-derived location by providing the DGPS corrections in the DGPS correction signal 26. These systems include a reference GPS receiver located at a known location to compute the DGPS corrections by comparing pseudoranges or location coordinates derived from the GPS satellite signal 14 to pseudoranges or location coordinates representing the known location, respectively, and a transmitter to broadcast information for the DGPS corrections in the DGPS correction signal 26. When the reference GPS receiver and the GPS antenna 12 are located within a few hundred kilometers, the accuracy of the GPS-derived location can be improved from a range of three-hundred meters to ten meters for a standard GPS location to a range of ten meters to less than one meter with the DGPS corrections. The radio receiver 24 for receiving the DGPS correction signal 26 for such systems is commercially available as a model DCI-3000 or DCI-1000 from Differential Corrections Inc. (DCI) of Cupertino, Calif.; a model DataPage from ACCQPOINT Communications Corporation of Irvine, Calif.; a model OMNISTAR model 6300 from John C. Chance & Associates, Inc. of Houston, Tex.; a model "ProBeacon" from Trimble Navigation, Ltd of Sunnyvale, Calif.; or others.

The accuracy of the GPS-derived location is further improved with the RTK system to a range of a few meters to less than a centimeter when the reference GPS receiver and the GPS antenna 12 are within a few tens of kilometers. The RTK system transmits RTK information of the reference carrier phases of the GPS satellite signal 14 as observed by the reference GPS receiver. The GPS receiver 16 computes a difference between the reference carrier phases and the carrier phases that it observes, thereby minimizing the effect several GPS measurement errors such as ionospheric delay, GPS satellite clock bias, and receiver clock bias. The radio receiver 24 for such systems is commercially available as a model RTK FM 100 from ACCQPOINT or a model series 4000 coupled through a Trimtalk 450 or Trimtalk 900 from Trimble Navigation.

FIG. 2 illustrates a general view of an integrated global positioning system/electronic distance measurement (GPS/EDM) surveying system of the present invention referred to by the general reference number 40. The GPS/EDM system 40 includes an electronic distance measurement (EDM) apparatus 41 for attachment to a range pole 42. Typically, the EDM apparatus 41 and the range pole 42 screw together with a ⅝ inch diameter thread. The apparatus 41 includes a housing 44. The housing 44 includes a section having a circular exterior 46 having a height in a range of one to ten centimeters. Each point on the circular exterior 46 is equidistant from a vertical center axis 48 passing coaxially through the range pole 42 to a bottom end point 50. In order to determine location coordinates of a first location 52, the range pole 42 is positioned vertically with the bottom end point 50 just touching the first location 52. Alternatively, the range pole may be inclined at a known vertical and azimuthal angle that is compensated either manually by a user or automatically in software or hardware in the GPS/EDM surveying system 40. The circular exterior 46 includes a reflective outer surface 54 extending 360° about the center axis 48 and suitable for reflecting a light beam 56 impinging from any direction within the 360° span. The height of the reflective outer surface 54 may be less than the height of the circular exterior 46 and the circular exterior 46 may include a circular recess (not shown) so that the outer surface of the reflective outer surface 54 is flush with the circular exterior 46.

A total station 58 positioned over a second location 60 transmits the light beam 56 toward the housing 44 and receives a reflection 62 of the light beam 56 from the reflective outer surface 54. Typically, the light beam 56 will have a wavelength in the infrared range, for example, approximately nine-hundred twenty nanometers. The total station 58 then compares the time or phase of modulation on the light beam 56 that is transmitted to the reflection 62 that is received to measure the distance between the total station 58 and the reflective outer surface 54. A range between the first location 52 and the second location 60 is calculated from the distance after applying several corrections including an effective horizontal offset 72 (FIG. 3b). A vertical angle and an azimuth angle may be measured by sighting through the station 58 to a point where the center of the reflective outer surface 54 crosses the center axis 48 of the range pole 42 and correcting for an EDM vertical offset 74 (FIG. 3a). Preferably, the reflective outer surface 54 is marked with a horizontal center line to facilitate the sighting.

Several light weight surfaces are suitable for the reflective outer surface 54 including reflective paint, reflective tape, and multiple prism reflectors such as used in bicycle reflectors formed into an annular ring. One such reflective tape is commercially available as "Scotchlite Diamond Grade" having a model number 980-10 or 3970-G from 3M Corporation of Saint Paul, Minn. When the Scotchlite tape is used and the housing 44 is made of a polycarbonate material such as LEXAN one should subject the plastic to 65° C. for twenty-four hours to determine that solvents used in the plastic will not outgas after the tape has been applied. Alternatively, the reflective outer surface 54 can be a plastic material molded or welded into the circular exterior 46. Some reflective paints, tapes, and prism reflectors include material that interferes with the reception of the GPS satellite signal 14. When such material is used, the reflective outer surface 54 should be positioned below the GPS antenna 12.

FIGS. 3a and 3b illustrate a side cross-section view and a top cross-section view, respectively, of the EDM apparatus 41 and the range pole 42. The GPS antenna 12 is positioned in the housing 44 so that the phase center 18 is on the center axis 48 of the reflective outer surface 54. The phase center 18 should be within two millimeters of the center axis 48 for typical survey accuracy requirements. Alternatively, the phase center 18 may a known horizontal offset at a known azimuth to the center axis 48 that is compensated manually by the user or automatically in software or hardware in the GPS/EDM surveying system 40. Representative examples of the GPS antenna 12 are disclosed in U.S. Pat. No. 5,272,485 for a MICROSTRIP ANTENNA WITH INTEGRAL LOW-NOISE AMPLIFIER FOR USE IN GLOBAL POSITIONING SYSTEM (GPS) RECEIVERS and U.S. Pat. No. 5,515,059 for a GPS RECEIVER WITH N-POINT SYMMETRICAL FEED DOUBLE-FREQUENCY PATCH ANTENNA. Although the approximate location of the phase center 18 for a microstrip type of GPS antenna 12 is the geometrical center of the upper radiating layer of the microstrip, the precise location varies within an electrical center error ellipsoid for, differing azimuths and elevations of the GPS satellite signal 14. Depending upon the accuracy required in the application and the actual design details of the GPS antenna 12, it may be necessary to correct the GPS-derived location for the azimuth and/or elevation of each GPS satellite that is used in the calculation of the GPS-derived location; or to specify that the GPS antenna 12 be of the same type and face the same direction as the GPS antenna used in the reference GPS receiver. U.S. Pat. No. 5,515,059 discloses a structure for reducing the size of the electrical center error ellipsoid by using multiple feedpoints to the microstrip.

In a preferred embodiment, the GPS receiver 16, the optional radio transmitter 20, and the optional radio receiver 24 are enclosed within the housing 44. Alternatively, the GPS receiver 16, the radio transmitter 20, and/or the radio receiver 24 can be external to the housing 44 and connected with one or more electrical cables. Care should be used so that the radio antennas used for the radio transmitter 20 and/or the radio receiver 24 do not interfere with the reception of the GPS satellite signal 14. An exemplary integrated GPS and radio antenna combination is described in U.S. Pat. No. 5,654,717.

The effective horizontal offset 72 corrects the measurement of range between the first location 52 (FIG. 2) and the second location 60 (FIG. 2) to compensate for the radius of the reflective outer surface 54. Because some of the energy in the reflection 62 will travel a longer distance by reflecting from points to the left and right of the closest point, the effective horizontal offset 72 from the center axis 48 is slightly smaller than the radius of the reflective outer surface 54. The effective horizontal offset 72 can be determined empirically by testing over a known range. Because the light beam 56 has some spread, the effective horizontal offset 72 may be a function of the range between the first and second locations 52 and 60 and a spreading angle of the light beam 56.

The EDM vertical offset 74 is a vertical length between the reflective outer surface 54 and the bottom end 50 and is determined with a mechanical measurement or by testing against a known vertical angle. In operation, the EDM vertical offset 74 is used for correcting a vertical angle that is measured by sighting from the station 58. A GPS vertical offset 76 for a length between the phase center 18 and the bottom end 50 is determined with a mechanical measurement or taking a difference between a GPS-derived location determined with carrier phase techniques and a known location of the bottom end 50. In operation, the GPS vertical offset is used for correcting the GPS-derived location in a vertical direction. Preferably, the GPS vertical offset 76 and the EDM vertical offset 74 are equal, thereby eliminating the requirement to apply separate corrections.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electronic distance measurement (EDM) apparatus (41), for attachment to a surveying range pole (42) for reflecting a light beam (56), comprising:
   a housing having a circular exterior (46) concentric with a vertical center axis (48) of said range pole (42); and
   a reflective outer surface (54) encircling said circular exterior (46) for reflecting said light beam (56) over an angular azimuth range of 360°.

2. The apparatus (41) of claim 1, wherein:
   the reflective outer surface (54) includes a tape attached to said circular exterior (46) and having a reflective side facing outward.

3. The apparatus (41) of claim 1, wherein:
   the reflective outer surface (54) includes a reflective paint adhered to said circular exterior (46).

4. The apparatus (41) of claim 1, wherein:
   the reflective outer surface (54) includes a horizontal annular ring including multiple prisms not more than ten centimeters thick.

5. The apparatus (41) of claim 1, further including:
   a GPS antenna (12) having a phase center (18) having a known spatial relationship with said center axis (48) for receiving a GPS satellite signal (14) and providing an antenna output signal representative of said GPS satellite signal (14).

6. The apparatus (41) of claim 5, wherein:
   said phase center (18) is on said center axis (48).

7. The apparatus (41) of claim 6, further including:
   a GPS receiver (16) coupled to the GPS antenna (12) for receiving said antenna output signal and providing information for a GPS-derived location of said phase center (18).

8. The apparatus (41) of claim 7, further including:
   a radio transmitter (20) coupled to the GPS receiver (16) for transmitting an airwave GPS location data signal (22) representative of said GPS-derived location.

9. The apparatus (41) of claim 7, further including:
   a radio receiver (24) for receiving a GPS real time kinematic signal (28) and passing information indicative of GPS reference carrier phase observations to the GPS receiver (16) for use in calculating said GPS-derived location.

10. The apparatus (41) of claim 7, further including:
    a radio receiver (24) for receiving an airwave differential GPS correction signal (26) and passing information indicative of DGPS corrections to the GPS receiver (16) for use in calculating said GPS-derived location.

11. The apparatus (41) of claim 1, further including:
    said range pole (42).

12. An integrated global positioning system/electronic distance measurement (GPS/EDM) surveying system (40), comprising:
    a range pole (42) having a vertical center axis (48);
    an EDM apparatus (41) for attachment to the range pole (42) including a housing (44) including a circular exterior (46) having a reflective outer surface (54) concentric with said center axis (48); a GPS antenna (12) having a phase center (18) on said center axis (48) for receiving a GPS satellite signal (14) and providing an antenna output signal representative of said GPS satellite signal (14); and a GPS receiver (16) coupled to the GPS antenna (12) for receiving said antenna output signal and providing information for a GPS-derived location of said phase center (18); and
    a total station (58) for transmitting a light beam (56) for illuminating said reflective outer surface (54), for receiving a reflection (62) of said light beam (56) from said reflective outer surface (54), and for calculating a range between the range pole (42) and the total station (58).

13. The system (40) of claim 12, further including:
    a radio transmitter (20) coupled to said GPS receiver (16) for transmitting an airwave GPS location data signal (22) representative of said GPS-derived location.

14. The system (40) of claim 12, further including:
    a radio receiver (24) for receiving an airwave GPS real time kinematic signal (28) and passing information indicative of GPS reference carrier phase observations to the GPS receiver (16) for use in calculating said GPS-derived location.

15. The system (40) of claim 12, further including:

a radio receiver (24) for receiving an airwave differential GPS correction signal (26) and passing information indicative of DGPS corrections to the GPS receiver (16) for use in calculating said GPS-derived location.

16. A method for making an electronic distance measuring (EDM) apparatus (41) for attachment to a surveying range pole (42), including steps of:

making a housing (44) having a circular exterior (46) for concentric attachment to said range pole (42) having a vertical center axis (48); and coating said circular exterior (46) with a reflective outer surface (54) for reflecting a light beam (56) over an angular azimuth range of 360° about said center axis (48).

17. The method of claim 16, wherein:

said reflective outer surface (54) is a reflective paint.

18. The method of claim 16, wherein:

said reflective outer surface (54) is a reflective tape.

19. The method of claim 16, wherein:

the reflective outer surface (54) includes a horizontal annular ring including multiple prisms not more than ten centimeters thick.

20. A method for surveying including steps of:

positioning a range pole (42) having an attached electronic measurement (EDM) apparatus (41) having a circular exterior (46) having a reflective outer surface (54) over an angular azimuth range of 360° about a vertical center axis (48) over a first location (52), positioning a total station (58) over a second location (60);

beaming a light beam (56) from said total station (58) to said reflective outer surface (54);

receiving a reflection (62) of said light beam (54) from said reflective outer surface (54) with said total station (58); and calculating a range between said first location (52) and said second location (60) by comparing information in said light beam (56) beamed from said total station with information received in said reflection (62).

21. The method of claim 20, further including steps of:

receiving a GPS satellite signal (14) with a GPS antenna (12) having a phase center (18) having a known spatial relationship with said center axis (48); and calculating a GPS-derived location for said phase center (18) with a GPS receiver (16) coupled to said GPS antenna (12).

22. The method of claim 21, wherein:

said phase center (18) is on said center axis (48).

* * * * *